(12) United States Patent
Scheuch et al.

(10) Patent No.: US 8,162,093 B2
(45) Date of Patent: Apr. 24, 2012

(54) BODY FOR A MOTOR VEHICLE

(75) Inventors: Volker Scheuch, Sailauf (DE); Werner Schmidt, Alzenau (DE); Joachim Schäfer, Darmstadt (DE); Martin Zilg, Aschaffenburg/Nilkheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 346 days.

(21) Appl. No.: 12/065,850

(22) PCT Filed: Sep. 12, 2006

(86) PCT No.: PCT/EP2006/008859
§ 371 (c)(1),
(2), (4) Date: Dec. 23, 2008

(87) PCT Pub. No.: WO2007/031267
PCT Pub. Date: Mar. 22, 2007

(65) Prior Publication Data
US 2009/0152899 A1     Jun. 18, 2009

(30) Foreign Application Priority Data

Sep. 15, 2005 (DE) .......................... 10 2005 044 079

(51) Int. Cl.
*B60R 21/34* (2006.01)
(52) U.S. Cl. .. 180/274; 180/271; 180/69.2; 296/187.04; 296/193.11
(58) Field of Classification Search .................. 180/274, 180/281, 271, 69.2, 69.21; 296/194, 187.04, 296/193.11
See application file for complete search history.

(56) References Cited

U.S. PATENT DOCUMENTS

| | | | | |
|---|---|---|---|---|
| 3,893,207 A * | 7/1975 | Rudaitis et al. | ............ | 180/69.21 |
| 4,530,412 A * | 7/1985 | Sigety, Jr. | .................. | 180/69.21 |
| 5,853,060 A * | 12/1998 | Chao et al. | .................... | 180/69.2 |
| 6,217,108 B1 * | 4/2001 | Sasaki | ....................... | 296/187.09 |
| 6,766,704 B2 | 7/2004 | Ritter et al. | | |
| 6,802,556 B2 * | 10/2004 | Mattsson et al. | ......... | 296/187.09 |
| 7,195,090 B2 * | 3/2007 | Parks et al. | .................... | 180/271 |
| 7,246,677 B2 * | 7/2007 | Fredriksson et al. | ......... | 180/274 |

(Continued)

FOREIGN PATENT DOCUMENTS

DE             10038972 C1     8/2001

(Continued)

OTHER PUBLICATIONS

German Patent Office, German Search Report for German Application No. 102005044079.7, Apr. 24, 2006.

(Continued)

*Primary Examiner* — Ruth Ilan
*Assistant Examiner* — George D. Spisich
(74) *Attorney, Agent, or Firm* — Ingrassia Fisher & Lorenz, P.C.

(57) ABSTRACT

A body for a motor vehicle comprises a frame, a bonnet connected on a first side to the frame by a hinge and on a second side by a bonnet lock, and at least one actuating element which can be extended in the event of an accident in order to raise the bonnet. The actuating element comprises a movable part acting on the first side of the bonnet. A catch of the bonnet lock is coupled to the movable part in order to release the bonnet lock (when said actuating element is extended.

20 Claims, 5 Drawing Sheets

U.S. PATENT DOCUMENTS 7,559,399 B2 * 7/2009 Lewis et al. .................. 180/274

FOREIGN PATENT DOCUMENTS

| DE | 10128967 | C1 | | 12/2002 |
|----|----------|----|----|---------|
| DE | 10152621 | A1 | | 5/2003 |
| DE | 10235630 | A1 | | 2/2004 |
| DE | 10308140 | B3 | | 9/2004 |
| DE | 10312393 | A1 | | 9/2004 |
| DE | 10314180 | A1 | | 9/2004 |
| DE | 103 43 106 | | * | 10/2004 |
| DE | 20320551 | U1 | | 10/2004 |
| DE | 10331047 | A1 | | 1/2005 |
| DE | 102004056122 | A1 | | 5/2006 |
| EP | 1400416 | A1 | | 3/2004 |
| GB | 2382549 | A | | 6/2003 |
| WO | 2004014703 | A1 | | 2/2004 |

OTHER PUBLICATIONS

International Searching Authority, International Search Report for PCT Application No. PCT/EP2006/008859, dated Sep. 12, 2006.

Japan Patent Office, Japanese Office Action Application No. 2008530403, dated Jun. 29, 2011.

* cited by examiner

BODY FOR A MOTOR VEHICLE

CROSS-REFERENCE TO RELATED APPLICATIONS

This application is a U.S. National-Stage entry under 35 U.S.C. §371 based on International Application No. PCT/EP2006/008859, filed Sep. 12, 2006, which was published under PCT Article 21(2) and which claims priority to German Application No. DE 10 2005 044 079.7, filed Sep. 15, 2005.

TECHNICAL FIELD

This invention relates to motor vehicles, and more particularly to a body for a motor vehicle.

BACKGROUND

Motor vehicle bodies are known, such as the body described in DE 103 12 393 A1. When the bonnet in this known body is raised in front to catch a pedestrian in the event of an accident, the bonnet lock must be released before the actuating element can begin to raise the bonnet. To effect this release, a bottom part of the actuating element is resting on a swivel lever which is operated upon the extension of the actuating element and releases the bonnet lock via a Bowden pull wire. Accordingly, the actuating element cannot begin to raise the bonnet immediately upon the beginning of its extension movement, but time and lift of the actuating element is lost to release the bonnet lock beforehand. The necessity of rendering the bottom part of the actuating element temporarily movable on the one hand, yet supporting it firmly enough, on the other hand, after a completed release of the bonnet lock so that it can raise the bonnet will result in a mechanically complex and possibly failure-prone construction.

It is at least our objective of this invention to create a body of the initially indicated type which achieves a release of the bonnet lock by means of a simple structure and in which the release of the bonnet lock does not result in any delay in raising the bonnet. In addition, other objectives, features and characteristics will become apparent from the subsequent detailed description, summary, and appended claims, taken in conjunction with the accompanying drawings and foregoing background.

SUMMARY

This problem is solved such that, in the body according to an embodiment of the invention, the actuating element comprises a movable part, acting on the first side of the bonnet, and that a catch of the bonnet lock is coupled to the movable part in order to release the bonnet lock upon the extension of this actuating element.

As the actuating element acts on a side of the bonnet away from the bonnet lock, it can begin to raise the bonnet without the release of the bonnet lock already having taken place. It is thus also possible to couple the release of the bonnet lock to that part of the actuating element which is movable with the bonnet while another part of the actuating element may be firmly anchored on the frame.

The catch and the actuating element are preferably coupled via a pull wire. Such a pull wire can be realized inexpensively and has little inert mass so that it does not appreciably delay the extension movement of the actuating element.

According to a first embodiment, one piece of the pull wire can act upon a point of action on the movable part of the actuating element itself. With the same effect, it could act upon a point of action on the first side of the bonnet raised by the actuating element.

Coupling via a swivable lever is also conceivable which is driven by the movable part of the actuating element. Pull wire and lever may also be arranged in series to couple the catch to the movement of the actuating element.

The lever preferably comprises two parts connected by a joint, the first one of which transmits to the second part a torque effected by the movable part of the actuating element upon raising the bonnet via a stop of the joint and which swivels in the joint under a torque effected upon lowering the bonnet in opposite direction. This allows the lever to slide off, in the course of the bonnet's upward movement, from an element effecting the torque so that the bonnet's upward movement is not limited by any possibly restricted mobility of the lever or the catch, but to restore the coupling again when the bonnet is moved back to its normal position.

The pull wire preferably extends from the bonnet lock up to a release lever, beyond the part acting upon the point of action. Said release lever can be provided in a manner known per se for a normal release of the bonnet and may be arranged in particular inside a passenger compartment of the vehicle.

To achieve a release of the bonnet lock not only via the release lever but also via the actuating element, that part of the pull wire acting upon the point of action is expediently freely displaceable, against the point of action, in a direction corresponding to a release of the bonnet lock.

In this case, the point of action may be an eye through which the pull wire is passed, and the pull wire comprises a thickening carried along by the eye upon the extension of the actuating element.

It is alternatively possible that the pull wire runs via two body-fixed points on both sides of the point of action coupled to the movement of the actuating element and that the way of the wire is lengthened between the body-fixed points via the point of action by means of the extension movement of the actuating element.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
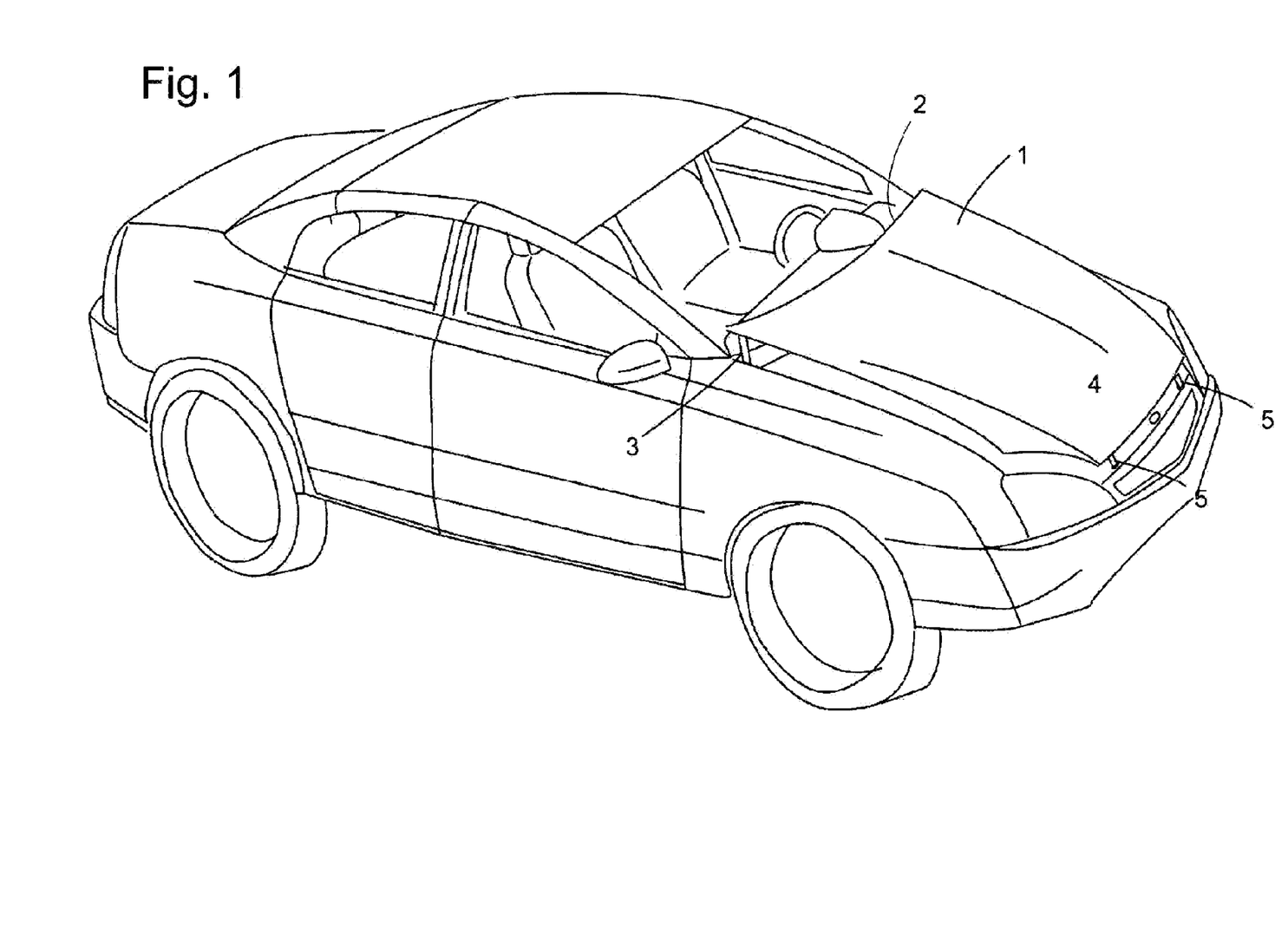
FIG. 1 shows a perspective view of a motor vehicle with a body according to the present invention.

FIG. 1 is a view of a motor vehicle with a body according to the invention. A bonnet 1 of the body is presented in a raised condition in which it is held by actuating elements 3 acting adjacent to the rear edge 2 of the bonnet 1 and by actuating elements 5 acting adjacent to the front edge 4 at a distance from an engine block concealed thereunder to increase the braking distance for a pedestrian impacting on the bonnet 1.

Figure 2:
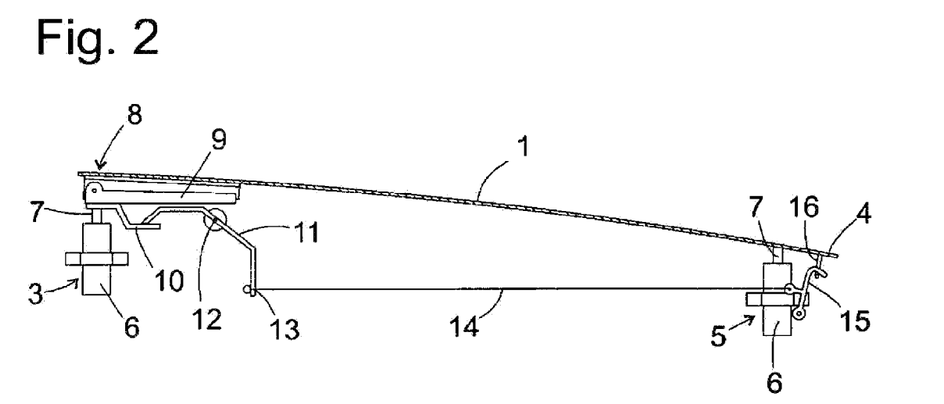
FIG. 2 shows a longitudinal section through the bonnet of the vehicle of FIG. 1 according to a first embodiment in closed condition.

FIG. 2 shows a section through the bonnet 1 according to a first embodiment of the invention, in a normal closed condition in which the bonnet 1 is flush with adjacent fenders of the body. FIG. 2 shows one each of the actuating elements 3, 5 existing in pairs. The actuating elements 3, 5 each comprise a cylinder 6 stationary on a frame—not shown—of the body and a movable piston 7 which, in the case of the front actuating element 5, acts directly on the bonnet, and in the case of the rear actuating element 3, acts via a hinge 8 on the bonnet. As long as the actuating element 3 is not activated, a lower leg 9 of the hinge 8 is immobile with regard to the frame and is therefore also designated as a stationary leg. The stationary leg 9 is rigidly connected with an arm 10 which acts on one side of a two-armed lever 11. The lever 11 is swivable about a stationary fulcrum 12 on the frame, and its second end forms a point of action 13 for a pull wire 14. This pull wire 14 acts on a swivable catch 15 which engages in a strap 16 protruding from the front edge 4 of bonnet 1 in the position shown in FIG. 2 and thus locks the bonnet 1 in the closed position.

Figure 3:
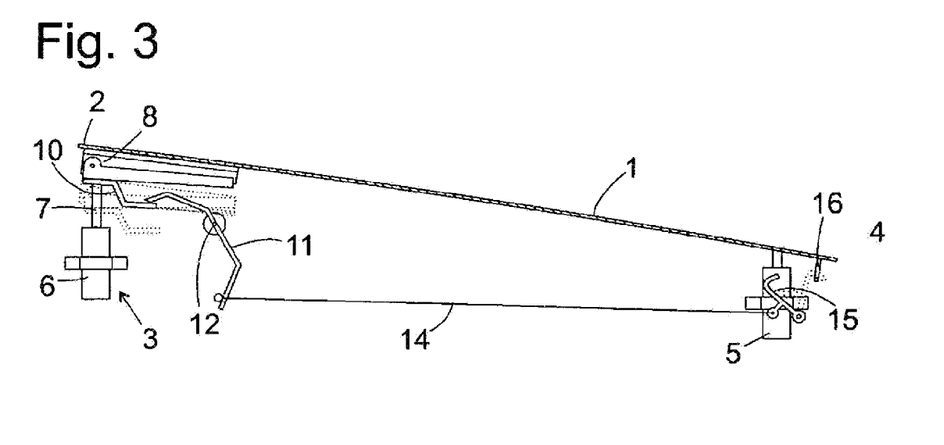
FIG. 3 shows a section through the bonnet of FIG. 2 during a raising action.

If an accident situation is registered in a manner known per se, the rear actuating elements 3 are immediately activated to raise the bonnet 1. As shown in FIG. 3, the lever 11 is turned by means of the arm 10 during this upward movement, and due to the resulting pull on the pull wire 14, the catch 15 disengages from the strap 16. With a specified delay versus the rear actuating elements 3 which is adequate for this release, the front actuating elements 5 are also activated to raise the front edge 4 of the bonnet, as shown in FIG. 4.

Figure 4:
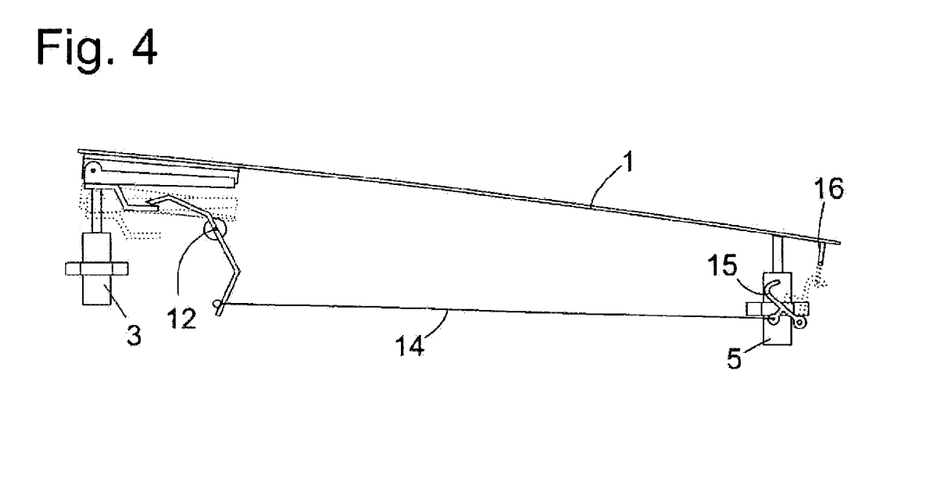
FIG. 4 shows the bonnet of FIG. 2 in fully raised condition.
Figure 5:
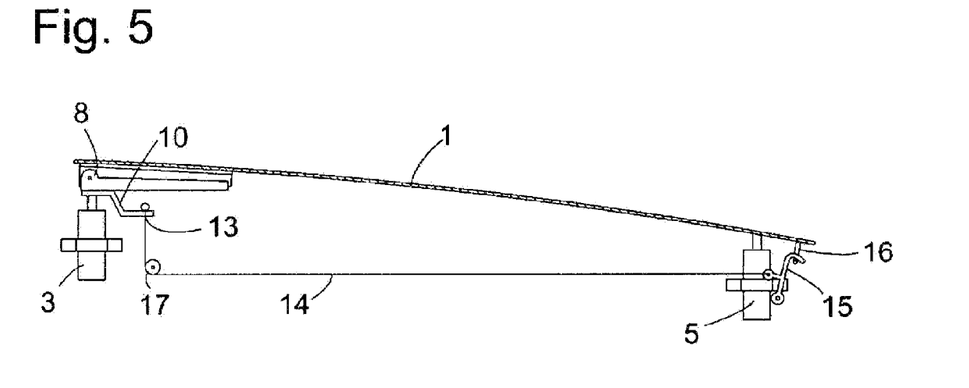
FIGS. 5 and 6 each show variations of the construction of FIG. 2.
Figure 6:
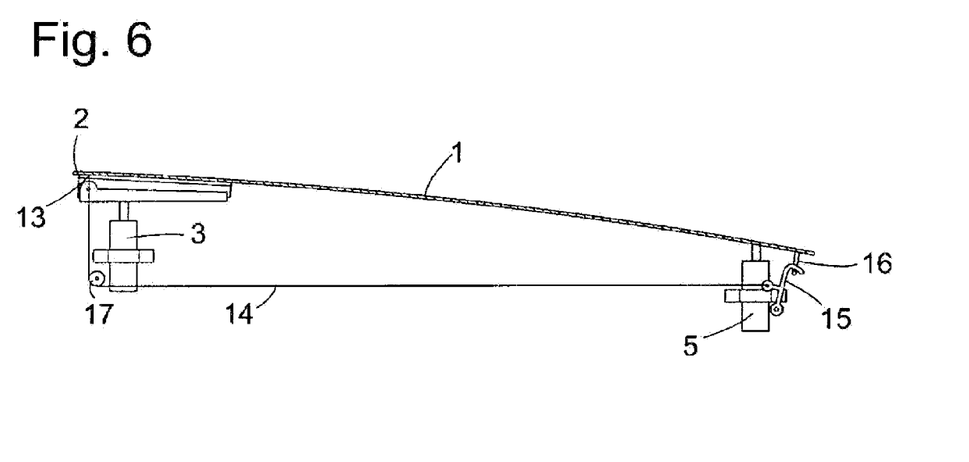

In a presentation analog to FIG. 2, FIG. 5 shows a modified embodiment in which lever 11 is replaced by a deflection roll 17 and the pull wire 14 extends between its point of action 13 formed on the arm 10 and the catch 15 over the deflection roll 17. The mode of operation of this modification is the same as that described with reference to the FIGS. 2 to 4. The same applies for the modification of FIG. 6 which differs from FIG. 5 by the point of action 13 of the pull wire 14 being located directly on the rear edge 2 of the bonnet 1.

Figure 7:
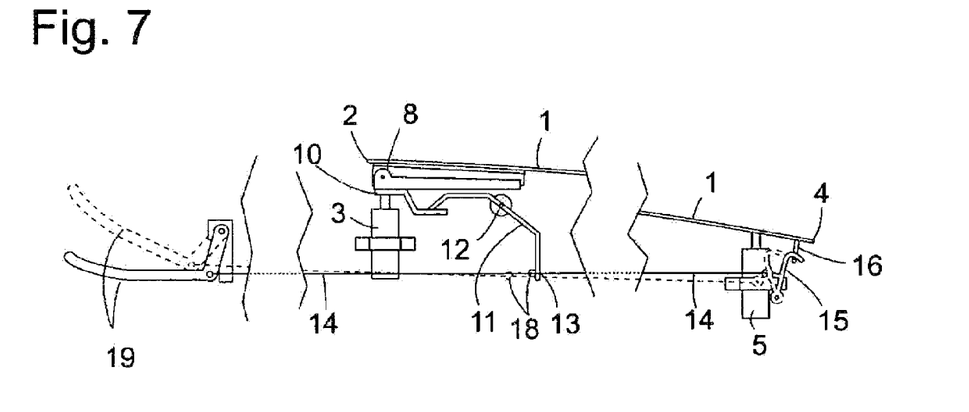
FIG. 7 shows a further developed embodiment in a schematic section.

FIG. 7 shows a preferred further development based on the embodiment of the FIGS. 2 to 4. Parts of this embodiment which correspond to those of the embodiment of FIGS. 2 to 4 are provided with the same reference symbols and are not described again. The point of action 13 of the pull wire 14 on lever 11 is here formed by an eye through which the pull wire 14 extends. On the side of the eye facing away from the catch 15, a pearl 18 is fastened on the pull wire 14 by which the pull wire is pulled along when the lever 11 turns upon the extension of the rear actuating element 3. However, the pull wire 14 extends beyond the pearl 18 up to a release lever 19 which is provided in the passenger compartment of the vehicle. By swiveling this release lever into the position presented in a dotted line in FIG. 7, the pull wire 14 in the Figure is pulled to the left, thereby gliding in the eye, and the pearl 18 moves away from the point of action 13: Thus, catch 15 is separated from strap 16, and the bonnet can be lifted up in hinge 8 to access the engine compartment. Thus, it is one and the same pull wire 14 which drives a normal release of the bonnet lock for opening the bonnet 1, as well as the release for raising the bonnet 1 in case of an accident.

Figure 8:
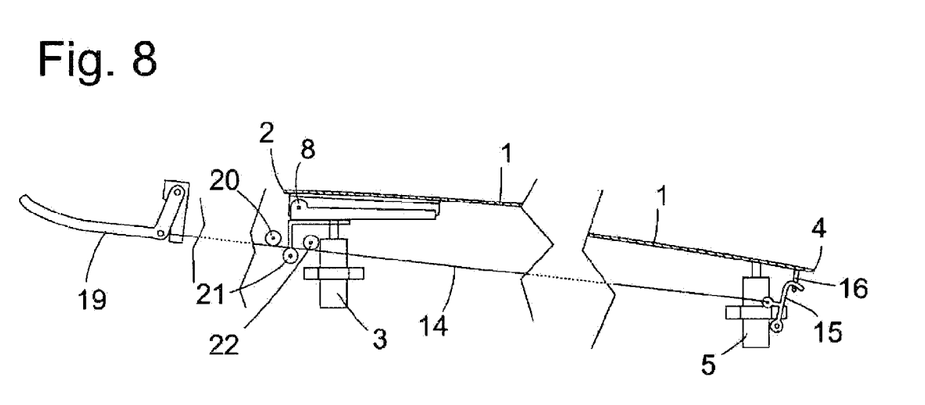
FIG. 8 shows a variant of the further developed embodiment, also in a schematic section.

FIG. 8 shows another modification which has the same effect as that of FIG. 7. The pull wire 14 here extends between the release lever 19 and the catch 15 via three deflection rolls 20, 21, 22, of which the two exterior ones 20, 22 are stationary on the frame and the center one 21 is fastened on hinge 8. While in the normal configuration of FIG. 8, with bonnet 1 not raised, the cable between the rolls 20, 22 extends essentially rectilinearly, it is forced—by the extension of the rear actuating element 3—on a non-rectilinear, lengthened path, with the result that catch 15 is pulled back and the bonnet lock is thus opened.

The actuating elements 3, 5 used for the above described embodiments may actually be of any type. However, reversible actuating elements are preferred, i.e. those which can be transferred, after extension by a user intervention, into a retracted, re-activatable condition again. Such an actuating element is described, for example, in DE 103 08 140 B3 so that its structure need not be entered into detail at this point. When such an actuating element is moved back again into its initial condition, it is also automatically possible to lock the bonnet lock again. That means, after an accident—if the vehicle is still ready to travel—the bonnet 1 can be returned to its normal position and the vehicle can continue to be used without the need to wait for the intervention by specialized personnel.

Figure 9:
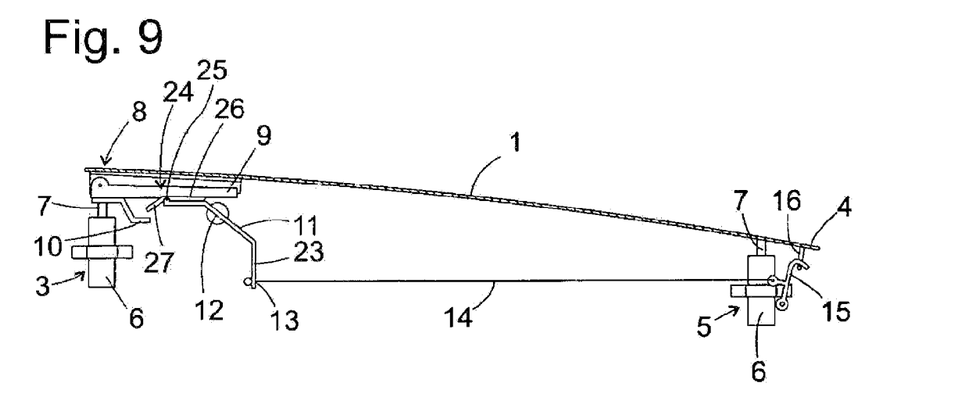
FIG. 9 shows a longitudinal section through the bonnet of the vehicle of FIG. 1 according to a third, preferred embodiment in closed condition.
Figure 10:
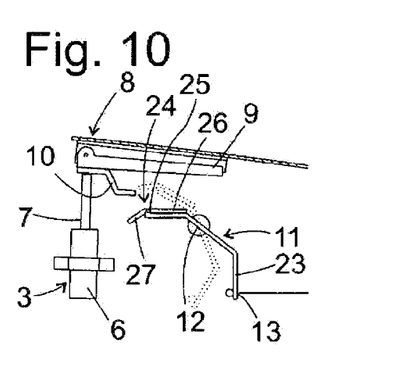
FIG. 10 shows the rear area of the bonnet of FIG. 9 in raised condition.
Figure 11:
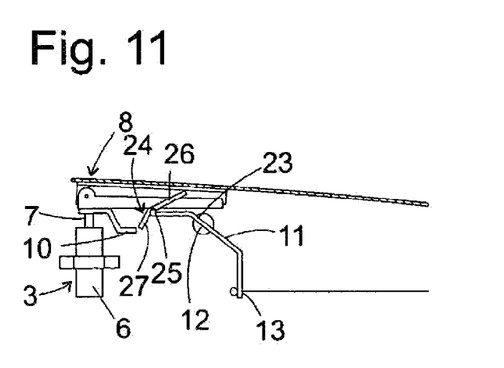
FIG. 11 shows the rear area of the bonnet of FIG. 9 while lowering.

A preferred further development of the embodiment described on the basis of FIGS. 2 to 4 is explained on the basis of FIGS. 9 to 11. FIG. 9 is a section, analog to FIG. 2, through the bonnet 1 in closed position. The embodiment of FIG. 9 differs from that of FIG. 2 essentially by the lever 11 and by the reversibility of the actuating elements 3, 5. While lever 11 in the embodiment of FIG. 2 is of a one-piece design, it comprises—according to FIG. 9—two parts, designated as front part 23 or, respectively, rear part 24 which are swivably connected by a joint 25. The front part 23 forms the front arm of lever 11, from fulcrum 12 up to the point of action 13 of the pull wire 14, as well as one part of the rear arm bearing the joint 25 on its end. The rear part 24 mounted on the joint 25 forms, in its turn, a dual-arm lever with a front arm 26 which rests on the front part 23 in the configuration shown, and a rear arm 27 which ends above the arm 10 movable with the actuating element 5 without touching it.

When the actuating element 3 raises the bonnet 1, the arm 10 is pushed from the bottom against the arm 27 of the rear part 24. Since its front arm 26 rests on the front part 23, it cannot swivel in the joint 25 so that the lever 11 is swiveled as a whole up to the position shown as a dotted outline in FIG. 10. As already described, lever 11 here takes along the pull wire 14 and thus pulls out the catch 15 from the strap 16 at the front edge of the bonnet.

Finally, with a progressing upward movement of the actuating element 3, the rear arm 27 slides off from the arm 10 so that the release movement comes to a standstill. The limited freedom of movement of catch 15 can now no longer obstruct the upward movement of the bonnet 1 so that raising the rear edge 2 of the bonnet 1 by 10 cm or more will be easily realizable. After sliding off from arm 10, the lever 11 returns to its normal position shown by a continuous line in FIG. 10.

When the actuating element 3 is reversed later, i.e. when arm 10 moves downward again from the position shown in FIG. 10, it pushes from above against the rear arm 27. The rear part 24 yields to the pressure of the arm 10 by swiveling in the joint 25, as shown in FIG. 11. The front arm 26 is thereby lifted from the front part 23. As soon as the arm 10 has passed in its downward movement the tip of the rear arm 27, the rear part 24 swivels back, under the weight of its front arm 26, into its normal position shown in FIG. 9, from which it can again release the bonnet 1 when the actuating element 3 is raised.

Figure 12:
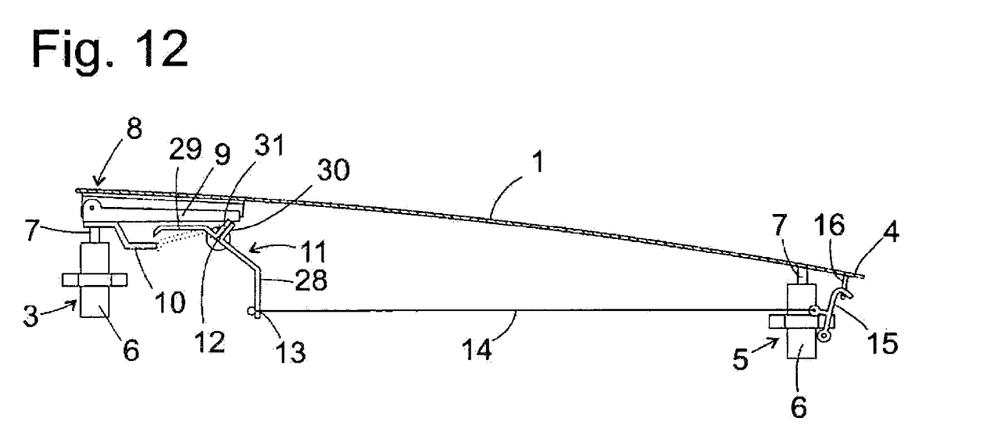
FIG. 12 shows a longitudinal section through the bonnet of the vehicle according to a fourth embodiment.

FIG. 12 presents a schematic section of a modification which achieves a similar effect as the embodiment of FIGS. 9 to 11. This embodiment essentially differs only by the lever 11 from the embodiment of FIGS. 9 to 11. Said lever is here structured into a front part 28 and a rear part 29 which are connected in an articulated manner in fulcrum 12, each part forming one arm of the lever 11. The parts 28, 29 each comprise a projection 30 or, respectively, 31 protruding from the fulcrum 12 which are held pressed against each other, by a spring not shown, in the normal position of the bonnet 1 shown in FIG. 12. When arm 10, upon the extension of actuating element 3, pushes against the tip of the rear part 29 and begins to apply torque on it, it will be transferred via the projections 30, 31 to the front part 28 whereby the pull wire 14 is pulled back and catch 15 disengages from the strap 16. The rear part 29 glides down from the arm 10 before the actuating element 3 reaches its upper stop position.

When the actuating element 3 is reversed and the arm 10 pushes from above against the rear part 29, the latter will be carried along and swiveled against the force of the spring not shown, without the front part 28 following the swivel movement. When the rear part 29 finally passes the arm 10 in the course of the reversing movement of the actuating element 3, as shown in FIG. 12 as a dotted outline, the part 29 returns by the force of the spring into the normal position shown by a continuous line.

Of course, the embodiments of FIGS. 9 to 11 or, respectively, 12 can also additionally provide a manual release of the bonnet lock by a pull wire 14 extended up to a release lever 19 in the passenger compartment, as described with reference to FIG. 7.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A body for a motor vehicle, comprising:
   a hinge;
   a bonnet lock comprising a catch;
   a frame;
   a bonnet connected to the frame on a first side by the hinge and on a second side by the bonnet lock;
   an actuating element adapted to extend in event of an accident in order to raise the bonnet, the actuating element comprising a movable part acting on the first side of the bonnet and the catch is coupled to the movable part in order to release the bonnet lock upon an extension of the actuating element; and
   a swivable lever coupling the catch to the actuating element, the swivable lever comprising a first part and a second part swivably connected by a joint, the first part is adapted to transmit a torque in a first direction that is applied by the movable part to the second part upon raising the bonnet via an abutment of the joint and swivels under the torque applied to the joint in an opposite direction to said first direction upon lowering the bonnet.

2. The body according to claim 1, wherein the catch is coupled to the actuating element via a pull wire.

3. The body according to claim 2, wherein a piece of the pull wire acts on a point of action on the movable part of the actuating element.

4. The body according to claim 2, wherein a piece of the pull wire acts on a point of action on the first side of the bonnet.

5. The body according to claim 2, wherein a piece of the pull wire acts on a point of action of the swivable lever.

6. The body according to claim 2, wherein the pull wire extends from the bonnet lock to a release lever.

7. The body according to claim 6, wherein a piece of the pull wire, acts against the point of action to release of the bonnet lock.

8. The body according to claim 7, wherein the point of action is an eye through which the pull wire is passed, and that the pull wire comprises a thickening carried along by the eye upon the extension of the actuating element.

9. The body according to claim 8, wherein the actuating element is transferable from the extended position to a retracted position.

10. The body according to claim 1, wherein both parts of the swivable lever are jointly swivable about a fulcrum, and that the joint is closer than the fulcrum to a point of action of the torque applied on the first part upon raising the bonnet.

11. A body for a motor vehicle, comprising:
    a hinge means;
    a bonnet lock means comprising a catch means;
    a frame means;
    a bonnet means connected to the frame means on a first side by the hinge means and on a second side by the bonnet lock means;
    an actuating element means adapted to extend in event of an accident in order to raise the bonnet means, the actuating element means comprising a movable part means acting on the first side of the bonnet means and the catch means is coupled to the movable part means in order to release the bonnet lock means upon an extension of the actuating element means; and
    a swivable lever means coupling the catch means to the actuating element means, the swivable lever means comprising a first part and a second part swivably connected by a joint means, the first part is adapted to transmit a torque in a first direction that is applied by the movable part means to the second part upon raising the bonnet means via an abutment of the joint means and swivels under the torque applied to the joint means in an opposite direction to said first direction upon lowering the bonnet means.

12. The body according to claim 11, wherein the catch means is coupled to the actuating element means via a pull wire means.

13. The body according to claim 12, wherein a piece of the pull wire means acts on a point of action on the movable part means of the actuating element means.

14. The body according to claim 12, wherein a piece of the pull wire means acts on a point of action on the first side of the bonnet means.

15. The body according to claim 12, wherein a piece of the pull wire means acts on a point of action of the swivable lever means.

16. The body according to claim 12, wherein the pull wire means extends from the bonnet lock means to a release lever means.

17. The body according to claim 16, wherein the piece of the pull wire means acts against the point of action to release of the bonnet lock means.

18. The body according to claim 17, wherein the point of action is an eye means through which the pull wire means is passed, and that the pull wire means comprises a thickening carried along by the eye means upon the extension of the actuating element means.

19. The body according to claim 18, wherein the actuating element means is transferable from the extended position to a retracted position means.

20. The body according to claim 11, wherein both parts of the lever means are jointly swivable about a fulcrum means and the joint means is closer than the fulcrum means to a point of action of the torque applied on the first part upon raising the bonnet means.

\* \* \* \* \*